US011100567B2

(12) United States Patent
Li

(10) Patent No.: US 11,100,567 B2
(45) Date of Patent: Aug. 24, 2021

(54) ORDER CLUSTERING AND MALICIOUS INFORMATION COMBATING METHOD AND APPARATUS

(71) Applicant: Advanced New Technologies Co., Ltd., George Town (KY)

(72) Inventor: Jiuxi Li, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/721,824

(22) Filed: Dec. 19, 2019

(65) Prior Publication Data
US 2020/0134702 A1 Apr. 30, 2020

Related U.S. Application Data

(63) Continuation of application No. 15/980,171, filed on May 15, 2018, which is a continuation of application No. PCT/CN2016/105137, filed on Nov. 9, 2016.

(30) Foreign Application Priority Data

Nov. 18, 2015 (CN) .......................... 201510795161.9

(51) Int. Cl.
*G06Q 30/00* (2012.01)
*G06Q 30/06* (2012.01)
(Continued)

(52) U.S. Cl.
CPC ......... *G06Q 30/0635* (2013.01); *G06F 16/00* (2019.01); *G06F 16/35* (2019.01);
(Continued)

(58) Field of Classification Search
None
See application file for complete search history.

(56) References Cited

U.S. PATENT DOCUMENTS

| 6,094,643 | A | 7/2000 | Anderson et al. |
| 7,376,618 | B1 * | 5/2008 | Anderson .............. G06Q 20/10 |
| | | | 705/38 |

(Continued)

FOREIGN PATENT DOCUMENTS

| CN | 101860822 | 10/2010 |
| CN | 103279868 | 9/2013 |

(Continued)

OTHER PUBLICATIONS

Zheng Qin, "Introduction to E-commerce", 2009, Springer, springer.com (Year: 2009).*

(Continued)

*Primary Examiner* — Naeem U Haq
*Assistant Examiner* — Norman Donald Sutch, Jr.
(74) *Attorney, Agent, or Firm* — Fish & Richardson P.C.

(57) ABSTRACT

Order information for an order representing an electronic transaction in the distributed order system for a product or a service is received by one or more processors over a network. A unique order ID and order content based on the received order information are generated. An order vector for the order is created based on the order content. The order is added to an order cluster based on a similarity between the created order vector and a representative order vector corresponding to a representative order in the order cluster. The representative order vector corresponding to the representative order in the order cluster is analyzed to determine if the representative order is malicious. A determination is made as to whether the representative order is malicious. If the representative order is malicious, then malicious order processing is performed on the orders in the order cluster.

18 Claims, 7 Drawing Sheets

(51) Int. Cl.
  *G06F 16/955* (2019.01)
  *G06F 16/00* (2019.01)
  *G06F 16/35* (2019.01)
  *G06F 16/907* (2019.01)
  *G06K 9/62* (2006.01)
  *H04L 29/06* (2006.01)

(52) U.S. Cl.
  CPC ........ *G06F 16/907* (2019.01); *G06F 16/9566* (2019.01); *G06K 9/6218* (2013.01); *G06Q 30/0185* (2013.01); *H04L 63/1483* (2013.01)

(56) References Cited

U.S. PATENT DOCUMENTS

| | | | |
|---|---|---|---|
| 8,170,966 B1 * | 5/2012 | Musat | H04L 51/12 706/14 |
| 8,291,024 B1 | 10/2012 | Cheng et al. | |
| 8,818,892 B1 | 8/2014 | Sprague et al. | |
| 10,078,861 B1 * | 9/2018 | Clare | G06Q 30/0635 |
| 2004/0148330 A1 | 7/2004 | Alspector et al. | |
| 2007/0027932 A1 * | 2/2007 | Thibeault | G06F 16/958 |
| 2008/0255991 A1 * | 10/2008 | Wang | G06Q 20/02 705/42 |
| 2011/0219008 A1 * | 9/2011 | Been | G06F 16/00 707/742 |
| 2012/0254188 A1 | 10/2012 | Koperski et al. | |
| 2012/0317644 A1 | 12/2012 | Kumar et al. | |
| 2013/0232045 A1 * | 9/2013 | Tai | G06Q 10/10 705/35 |
| 2014/0259157 A1 | 9/2014 | Toma et al. | |
| 2015/0095247 A1 | 4/2015 | Duan | |
| 2016/0352772 A1 * | 12/2016 | O'Connor | H04L 63/1483 |
| 2018/0268015 A1 * | 9/2018 | Sugaberry | G06N 3/063 |
| 2018/0268464 A1 | 9/2018 | Li | |

FOREIGN PATENT DOCUMENTS

| | | | | |
|---|---|---|---|---|
| CN | 103632250 | 3/2014 | | |
| CN | 104182539 | 12/2014 | | |
| CN | 104182539 A | * 12/2014 | ............ | G06F 17/30 |
| JP | 2003036382 | 2/2003 | | |
| JP | 2008287478 | 11/2008 | | |
| JP | 2009199341 | 9/2009 | | |
| JP | 2013015971 | 1/2013 | | |
| KR | 20100098242 | 9/2010 | | |

OTHER PUBLICATIONS

Vijay Hanagandi et al; "Density-Based Clustering and Radial Basis Function Modeling to Generate Credit Card Fraud Scores"; Jun. 6, 1996; IEEEXplore (Year: 1996).*

Crosby et al., "BlockChain Technology: Beyond Bitcoin," Sutardja Center for Entrepreneurship & Technology Technical Report, Oct. 16, 2015, 35 pages.

European Extended Search Report in European Application No. 16865698.1, dated Oct. 10, 2018, 7 pages.

International Search Report issued by the International Searching Authority in International Application No. PCT/CN2016/105137 dated Feb. 13, 2017; 9 pages.

Nakamoto, "Bitcoin: A Peer-to-Peer Electronic Cash System," www.bitcoin.org, 2005, 9 pages.

PCT International Preliminary Report on Patentability in International Application No. PCT/CN2016/105137, dated May 22, 2018, 10 pages (with English Translation).

Umekin et al., "Hadoop—how about the ability as a corporate system? The batch of 10 million affairs is performed in 2 minutes. It is proportional to a node number and performances are improvement ," Nikkei Systems, Japan, Nikkei BP, Oct. 26, 2010, No. 211, pp. 62-67 (with Machine Translation).

* cited by examiner

ORDER CLUSTERING AND MALICIOUS INFORMATION COMBATING METHOD AND APPARATUS

This application is a continuation of U.S. patent application Ser. No. 15/980,171, filed on May 15, 2018, which is a continuation of PCT Application No. PCT/CN2016/105137, filed on Nov. 9, 2016, which claims priority to Chinese Patent Application No. 201510795161.9, filed on Nov. 18, 2015, and each application is hereby incorporated by reference in its entirety.

TECHNICAL FIELD

The present application relates to the field of network communications technologies, and in particular, to order clustering and malicious information combating method and apparatus.

BACKGROUND

In existing e-commerce technologies, each transaction is considered as an "order". For example, initiation of the "Collect" service in the Alipay application software is considered as an order, and each remittance transaction is also considered as an order. Malicious information can exist in an order. For example, a malicious user of the "Collect" service in the Alipay application software can send a "Collect" request to a large number of Alipay users, and changes the consumption record note corresponding to each order to a phishing website address. Most phishing websites include slogans such as "Seven Anniversary of Taobao". Because the websites are linked to the official website of Alipay, the users may trust and visit the websites. It can cause large capital losses for the users, and affect the reputation of Alipay.

In the existing technologies, keywords are usually used to filter and identify malicious information, but there are certain disadvantages. For example, keyword filtering can function when the keywords filtered are known as junk keywords. When the malicious user makes adjustments by modifying the keywords included in the malicious information, the keyword filtering solution may fail and cannot play a proactive role in identifying the malicious information. Filtering malicious information generated in various ways and in various forms can be improved through manually monitoring and adding keywords. This passive countermeasure can lead to high costs in identifying malicious information.

SUMMARY

To resolve the existing problem of inaccurate and inflexible order classifications in electronic transactions, order clustering and malicious information combating method and apparatus can be provided. In the technical solutions of the present application, after an order is preliminarily processed, a clustering operation can be performed to more accurately classify the order and reduce human involvement. In addition, orders in a malicious information cluster can be quickly processed through the corresponding malicious information combating method and apparatus.

An implementation of the present application provides a method for order clustering in an electronic transaction, including: generating a unique order identifier (ID) and order content based on information about an order; converting the order content to an order vector; and performing a clustering operation based on the unique order ID and the order vector to obtain an order clustering result.

An implementation of the present application further provides a method for combating malicious information based on order clustering, including: generating a unique order ID and order content based on information about an order; converting the order content to an order vector; performing a clustering operation based on the unique order ID and the order vector to obtain an order clustering result; analyzing content of a representative order in each cluster; and if the content of the representative order includes malicious information, performing corresponding processing of orders in the cluster.

An implementation of the present application further provides an apparatus for order clustering in an electronic transaction, including: a generation unit, configured to generate a unique order ID and order content based on information about an order; a vector conversion unit, configured to convert the order content to an order vector; and a clustering operation unit, configured to perform a clustering operation based on the unique order ID and the order vector to obtain an order clustering result.

An implementation of the present application further provides an apparatus for combating malicious information based on order clustering, including: a generation unit, configured to generate a unique order ID and order content based on information about an order; a vector conversion unit, configured to convert the order content to an order vector; a clustering operation unit, configured to perform a clustering operation based on the unique order ID and the order vector to obtain an order clustering result; and a processing unit, configured to: analyze content of a representative order in each cluster, and if the content of the representative order includes malicious information, perform corresponding processing of orders in the cluster.

It can be seen from the technical solutions provided in the implementations of the present application, a clustering algorithm is used to automatically classify orders in electronic transactions; a new cluster can be obtained through analysis based on real-time content of the order; and an obtained cluster including malicious information can be correspondingly processed. As such, human involvement can be reduced, and a new cluster can be automatically processed.

Certainly, products or methods that implement the present application do not necessarily need to achieve the earlier mentioned advantages.

BRIEF DESCRIPTION OF DRAWINGS

To describe the technical solutions in the implementations of the present application or in the prior art more clearly, the following briefly describes the accompanying drawings. Apparently, the accompanying drawings in the following description merely show some implementations of the present application, and a person of ordinary skill in the art can still derive other drawings from these accompanying drawings without creative efforts.

DESCRIPTION OF EMBODIMENTS

The implementations of the present application provide order clustering and malicious information combating method and apparatus.

To make a person skilled in the art understand the technical solutions in the present application better, the following clearly and completely describes the technical solutions in the implementations of the present application with reference to the accompanying drawings in the implementations of the present application. Apparently, the described implementations are merely some but not all of the implementations of the present application. Other implementations obtained by a person of ordinary skill in the art based on the implementations of the present application without creative efforts shall fall within the protection scope of the present application.

Figure 1:
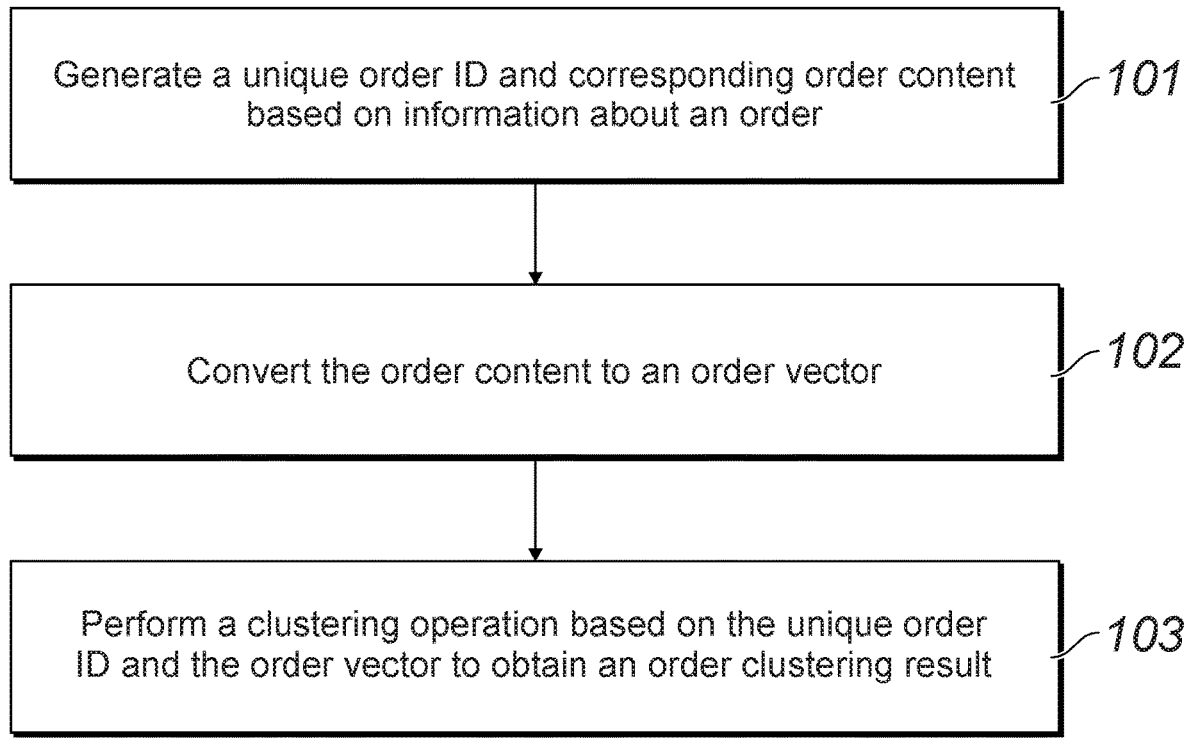
FIG. 1 is a flowchart illustrating a method for order clustering in an electronic transaction, according to an implementation of the present application.

FIG. 1 is a flowchart illustrating a method for order clustering in an electronic transaction, according to an implementation of the present application. In this implementation, some information transferred is normal, and some information transferred is malicious. Because information transferred by a user is forwarded by a server in an electronic transaction system, the method in this implementation can be implemented by the server of the electronic transaction system. A clustering algorithm such as the mean-shift clustering algorithm can be used to automatically classify the information transferred, and a new cluster can be automatically created. A developer does not need to predetermine the number of clusters. This classification method can be more flexible, improves self-identification accuracy of content of the orders, and classification accuracy. In addition, it can reduce human involvement, improve work efficiency, and improve processing efficiency of subsequent malicious information combating.

FIG. 1 includes the following steps: Step 101: Generate a unique order identifier (ID) and corresponding order content based on information about an order.

Step 102: Convert the order content to an order vector.

Step 103: Perform a clustering operation based on the unique order ID and the order vector to obtain an order clustering result.

In this implementation, the mean-shift clustering algorithm can be used to perform the clustering operation on the order to obtain the order clustering result. A mean-shift clustering operation is a non-parametric multi-model segmentation method. Its basic computation module uses a conventional pattern recognition program. Segmentation is achieved based on analyzing an image eigenspace and a clustering method. In the mean-shift clustering operation, a local maximum value of an eigenspace probability density function is directly estimated to obtain a density pattern of an unknown cluster and determine a location of the pattern. Then the order is added to a cluster related to the pattern. In actual implementations, a proper clustering algorithm can be selected or used as needed.

According to an implementation of the present application, the method further includes a step of mapping content of an order in the cluster to a characteristic string. When a mapped string of content of an order to be analyzed is the same as the characteristic string, the order to be analyzed is directly added to the cluster.

According to an implementation of the present application, before generating the unique order ID and order content based on information about an order, the method further includes: importing the order to a Hadoop distributed file system (HDFS). Subsequent steps in the present application can be performed in the HDFS to improve processing efficiency. Certainly, it is optional to perform other steps of the present disclosure in the HDFS. Those steps can be performed in other distributed systems, and the efficiency may also be improved. Details are omitted here for simplicity.

According to an implementation of the present application, the generating a unique order ID and order content based on information about an order further includes: generating the unique order ID based on a user ID, an order ID, and a service type in the information about the order; and generating the order content based on an order title or an order remark in the information about the order.

In addition to generating the unique order ID based on a combination of the three fields: the user ID, the order ID, and the service type in this implementation, the unique order ID can be generated based on any combinations of the user ID, the order ID, and the service type. Alternatively, content of another field (such as an external order number) can also be included to generate the unique order ID.

The order title can include a product description and an order description. For example, an order title of a collection service can include a service name, a payor, or a message. The order remark can include promotional information of a user who initiates the order, such as a uniform resource locator (URL) address, a promotional text, or a promotional picture.

According to an implementation of the present application, converting the order content to an order vector includes: converting the order content to a term frequency-inverse document frequency (TF-IDF) vector.

In this implementation of the present application, the mean-shift clustering algorithm can be used to automatically classify the order in the electronic transaction, and a new cluster can be obtained through analysis based on real-time content of the order. When the order is processed, it can be transcoded. It can then be determined whether the transcoded order is the same as a characteristic string of an order in a certain cluster, in order to further improve order classification efficiency. Orders can be imported to a distributed file system such as the HDFS to further improve order classification efficiency, by taking advantage of the characteristics of the distributed system.

Figure 2:
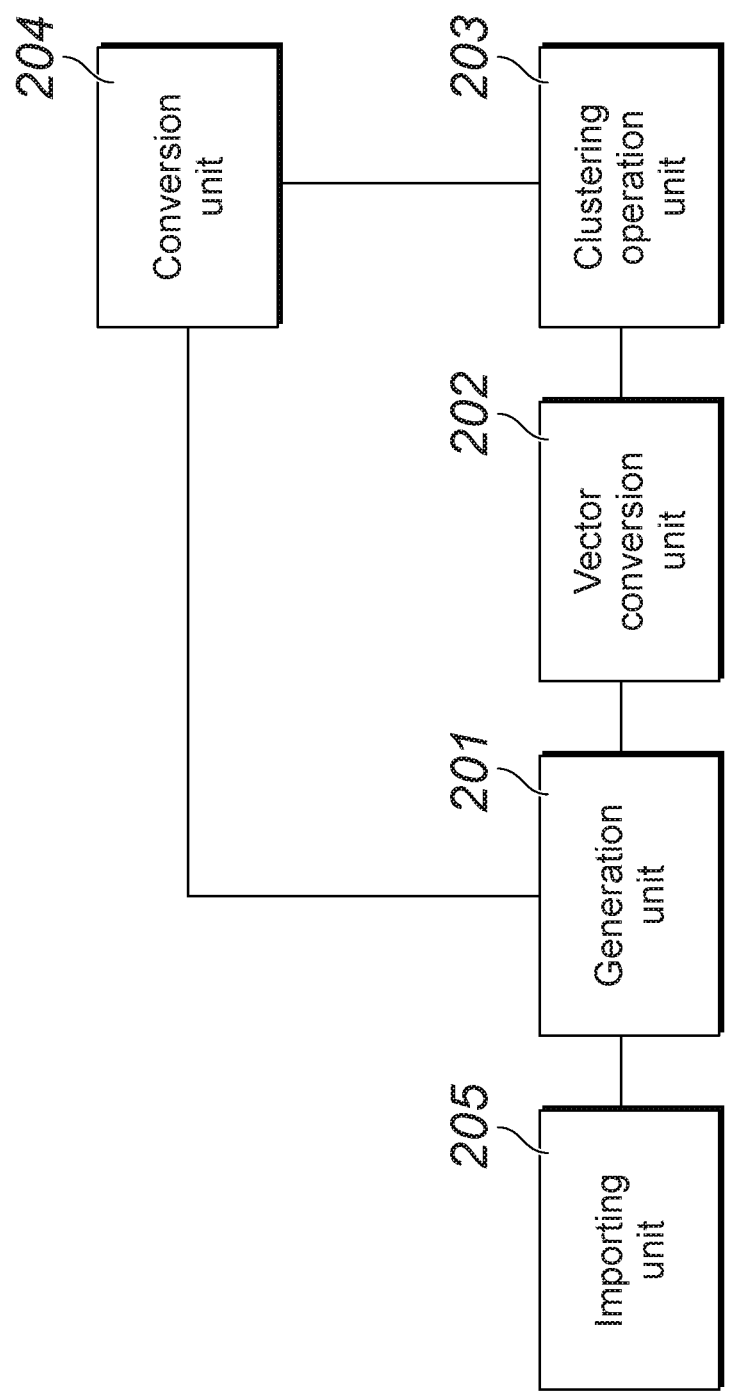
FIG. 2 is a schematic structural diagram illustrating an apparatus for order clustering in an electronic transaction, according to an implementation of the present application.

FIG. 2 is a schematic structural diagram illustrating an apparatus for order clustering in an electronic transaction, according to an implementation of the present application. The apparatus in this implementation can be installed on a server of an electronic transaction system. Or, a high-performance server can be separately used to implement the apparatus in this implementation. Each functional unit or module of the apparatus in this implementation can be implemented by a dedicated central processing unit (CPU), a single-chip microcomputer, or a field programmable gate array (FPGA), or can be implemented by a general-purpose processor executing control logic of each functional module. A functional module of the apparatus in this implementation can perform a mean-shift clustering operation to effectively classify an order, and can obtain a new cluster based on order content. A developer does not need to predetermine the number of clusters. As such, self-identification of combating malicious information based on order clustering, classification accuracy, and work efficiency can be improved, and human involvement can be reduced.

The apparatus in this implementation includes: a generation unit 201, configured to generate a unique order ID and order content based on information about an order; a vector conversion unit 202, configured to convert the order content to an order vector; and a clustering operation unit 203, configured to perform a clustering operation based on the unique order ID and the order vector to obtain an order clustering result.

According to an implementation of the present application, the apparatus further includes a conversion unit 204 that connects the generation unit and the clustering operation unit, and configured to: map content of an order in the cluster to a characteristic string. When a mapped string of content of an order is the same as the characteristic string, add the order to the cluster.

According to an implementation of the present application, the apparatus further includes an importing unit 205, configured to import the order to a Hadoop distributed file system (HDFS).

According to an implementation of the present application, the generation unit is further configured to: generate the unique order ID based on a user ID, an order ID, and a service type included in the order information; and generate the order content based on an order title or an order description included in the order information.

According to an implementation of the present application, the vector conversion unit is further configured to convert the order content to a TF-IDF vector.

In the apparatus in this implementation of the present application, the mean-shift clustering algorithm can be used to automatically classify the order in the electronic transaction, and a new cluster can be obtained through analysis based on real-time content of the order. When the order is processed, it can be transcoded. It can then be determined whether the transcoded order is the same as a characteristic string of an order in a certain cluster, in order to further improve order classification efficiency. The order can be imported to a distributed file system such as HDFS to further improve order classification efficiency, by taking advantage of the characteristics of the distributed system.

Figure 3:
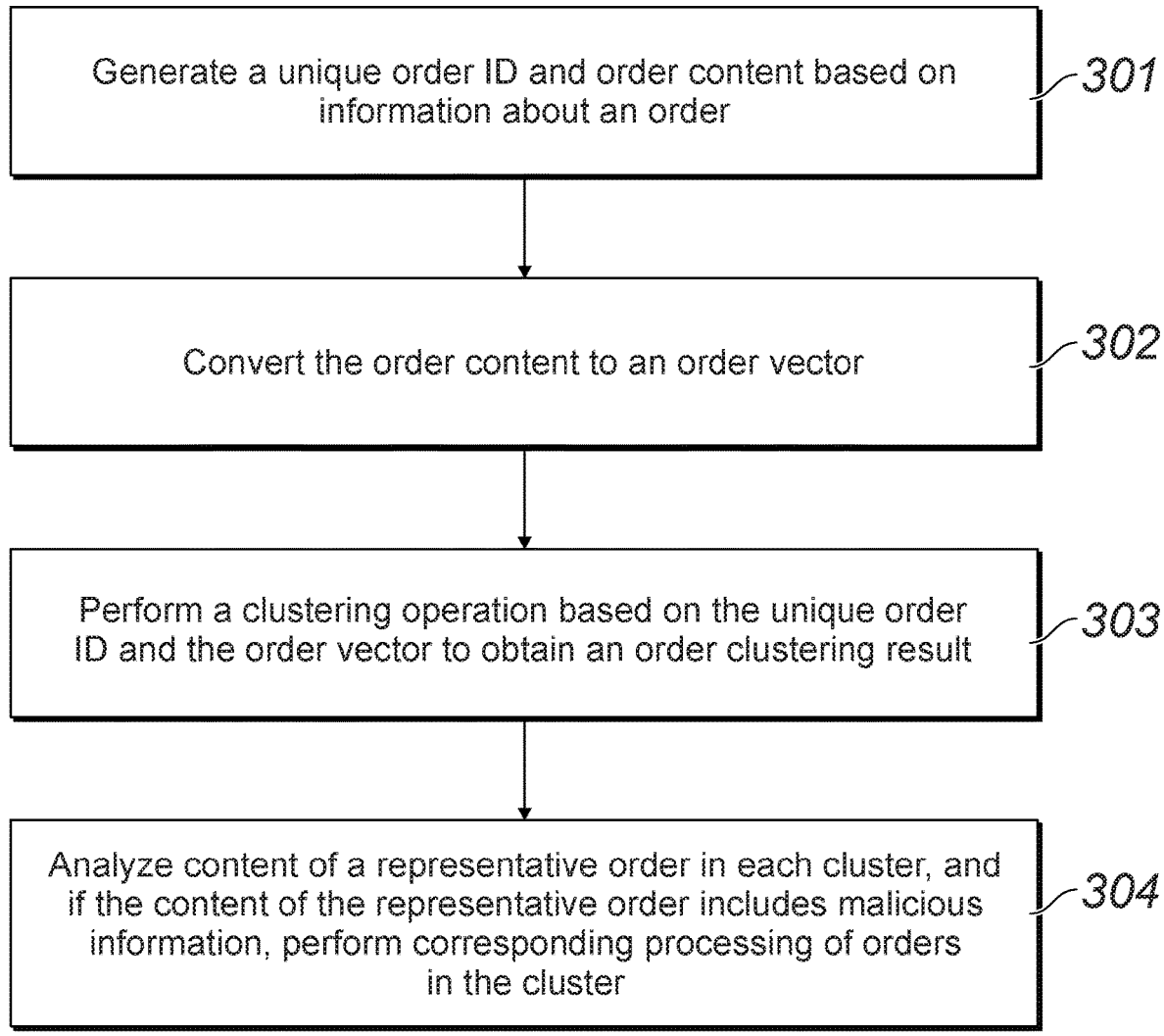
FIG. 3 is a flowchart illustrating a method for combating malicious information based on order clustering, according to an implementation of the present application.

FIG. 3 is a flowchart illustrating a method for combating malicious information based on order clustering, according to an implementation of the present application. In this implementation, a generated cluster is analyzed to determine which cluster includes malicious information (such as a junk order). An electronic transaction risk can be avoided by performing corresponding processing of orders in the cluster.

In the figure, the following steps are included: Step 301: Generate a unique order ID and order content based on information about an order.

Step 302: Convert the order content to an order vector.

Step 303: Perform a clustering operation based on the unique order ID and the order vector to obtain an order clustering result.

Step 304: Analyze content of a representative order in each cluster, and if the content of the representative order includes malicious information, perform corresponding processing of orders in the cluster.

An existing method can be used to determine whether the content of the order in the cluster is malicious information. For example, whether content of a certain order in the cluster is malicious information is determined based on a keyword, or the order content is manually screened. The corresponding processing can include recording a user ID in the cluster, sending the user ID to an administrator for banning the user ID, sending alarm information to the user ID, etc.

According to an implementation of the present application, the method further includes a step of mapping content of an order in the cluster to a characteristic string. When a mapped string of order content of an order is the same as the characteristic string, the order is directly added to the cluster.

According to an implementation of the present disclosure, when the mapped string of the order is the same as the characteristic string, the method further includes: when the cluster has been marked as a junk class, directly perform automatic malicious information processing such as freezing the transaction or blocking the user account associated with the order.

The order content is of an order randomly selected from the cluster.

Based on the earlier described steps, the order to be analyzed can be classified based on the clusters obtained after the clustering operation. For a certain user, most information transferred (e.g. an order) can be the same. Therefore, the cluster that includes the information transferred has been obtained through the earlier described clustering algorithm. A characteristic sample (the most representative information transferred) in the cluster is transcoded to an MD5 code. When information transferred is received again, whether the information transferred is included in the cluster can be determined by converting the information transferred to an MD5 code and comparing the two MD5 codes. Based on the earlier described technical solution, a person skilled in the art can infer that other types of transcoding can be feasible. Details are not repeated here for simplicity.

In the method in this implementation of the present application, the mean-shift clustering algorithm can be used to automatically classify the order in the electronic transaction (in actual implementations, a proper clustering algorithm can be selected or used as needed), and a new cluster can be obtained through analysis based on real-time content of the order. When the order is processed, it can be transcoded. It can then be determined whether the transcoded order is the same as a characteristic string of an order in a certain cluster, in order to further improve order classification efficiency. The order can be imported to a distributed file system such as an HDFS to further improve order classification efficiency, by taking advantage of the characteristics of the distributed system. Because only similar orders are clustered in one cluster, content of one representative order in a cluster can be analyzed to determine whether the entire cluster is a malicious information cluster, which simplifies the process of comparing and determining each order.

Figure 4:
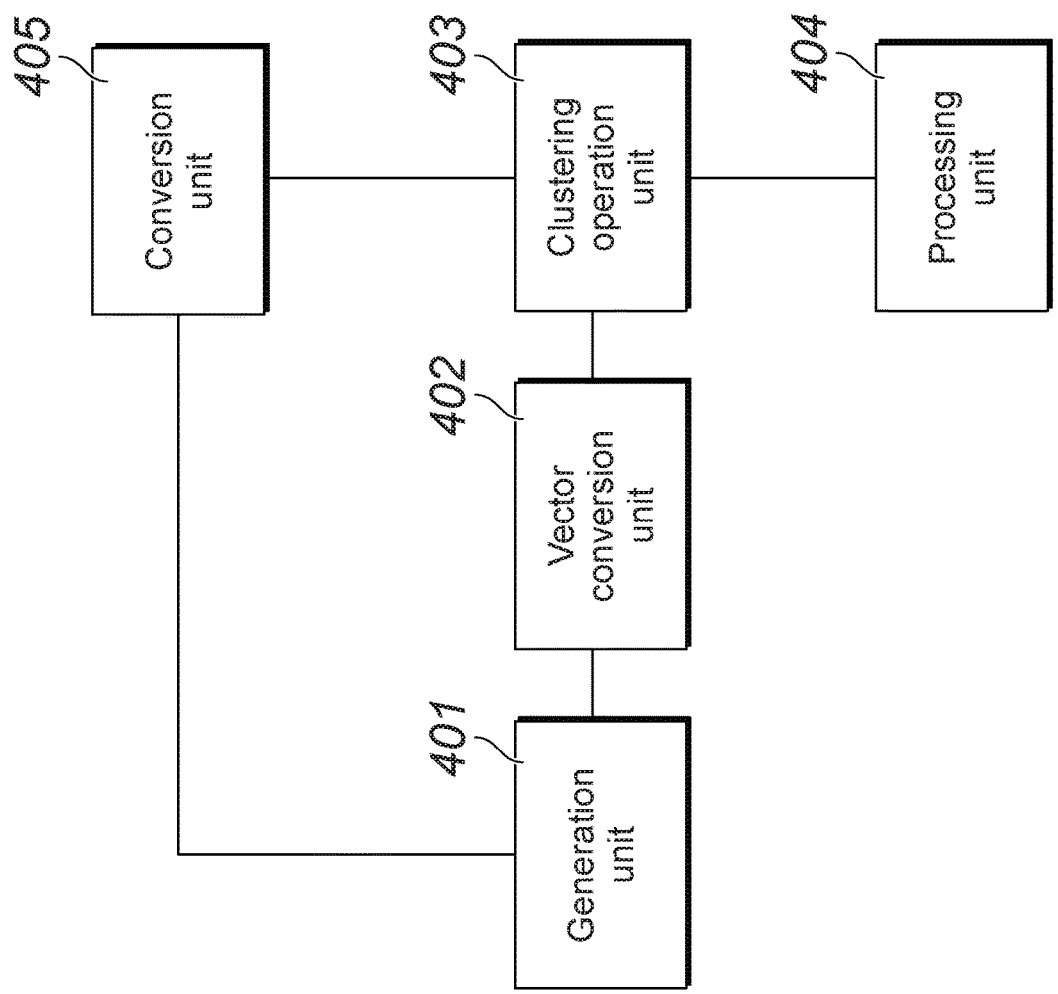
FIG. 4 is a schematic structural diagram illustrating an apparatus for combating malicious information based on order clustering, according to an implementation of the present application.

FIG. 4 is a schematic structural diagram illustrating an apparatus for combating malicious information based on order clustering, according to an implementation of the present application. The apparatus in this implementation can be installed on a server of an electronic transaction system. Or, a high-performance server can be separately used to implement the apparatus in this implementation. Each functional unit or module of the apparatus in this implementation can be implemented by a dedicated CPU, a single-chip microcomputer, or an FPGA, or can be implemented by a general-purpose processor executing control logic of each functional module. A functional module of the apparatus in this implementation can perform a mean-shift clustering operation to effectively classify an order, and can obtain a new cluster based on order content. Developers do not need to predetermine the number of clusters. As such, self-identification of combating malicious information based on order clustering, classification accuracy, and work efficiency can be improved, and human involvement can be reduced.

The implementation illustrated in the figure includes: a generation unit 401, configured to generate a unique order ID and order content based on information about an order; a vector conversion unit 402, configured to convert the order content to an order vector; a clustering operation unit 403, configured to perform a clustering operation based on the unique order ID and the order vector to obtain an order clustering result; and a processing unit 404, configured to analyze content of a representative order in each cluster, and if the content of the representative order includes malicious information, perform corresponding processing of orders in the cluster.

According to an implementation of the present application, the apparatus further includes a conversion unit 405 that connects the generation unit and the clustering operation unit, and configured to map content of an order in the cluster to a characteristic string. When a mapped string of order content of an order is the same as the characteristic string, add the order to be analyzed to the cluster.

According to an implementation of the present application, the conversion unit is further configured to directly send the order to be analyzed to the processing unit for automatic malicious information processing (such as transaction freezing or account blocking), when the cluster has been marked as a junk class.

In the apparatus in this implementation of the present application, the mean-shift clustering algorithm can be used to automatically classify the order in the electronic transaction (in actual implementations, a proper clustering algorithm can be selected or used as needed), and a new cluster can be obtained through analysis based on real-time content of the order. When the order is processed, it can be transcoded. It can then be determined whether the transcoded order is the same as a characteristic string of an order in a certain cluster, in order to further improve order classification efficiency. The order can be imported to a distributed file system such as an HDFS to further improve order classification efficiency, by taking advantage of the characteristics of the distributed system. Because only similar orders are clustered in one cluster, content of one representative order in a cluster can be analyzed to determine whether the entire cluster is a malicious information cluster, which simplifies the process of comparing and determining each order.

Figure 5:
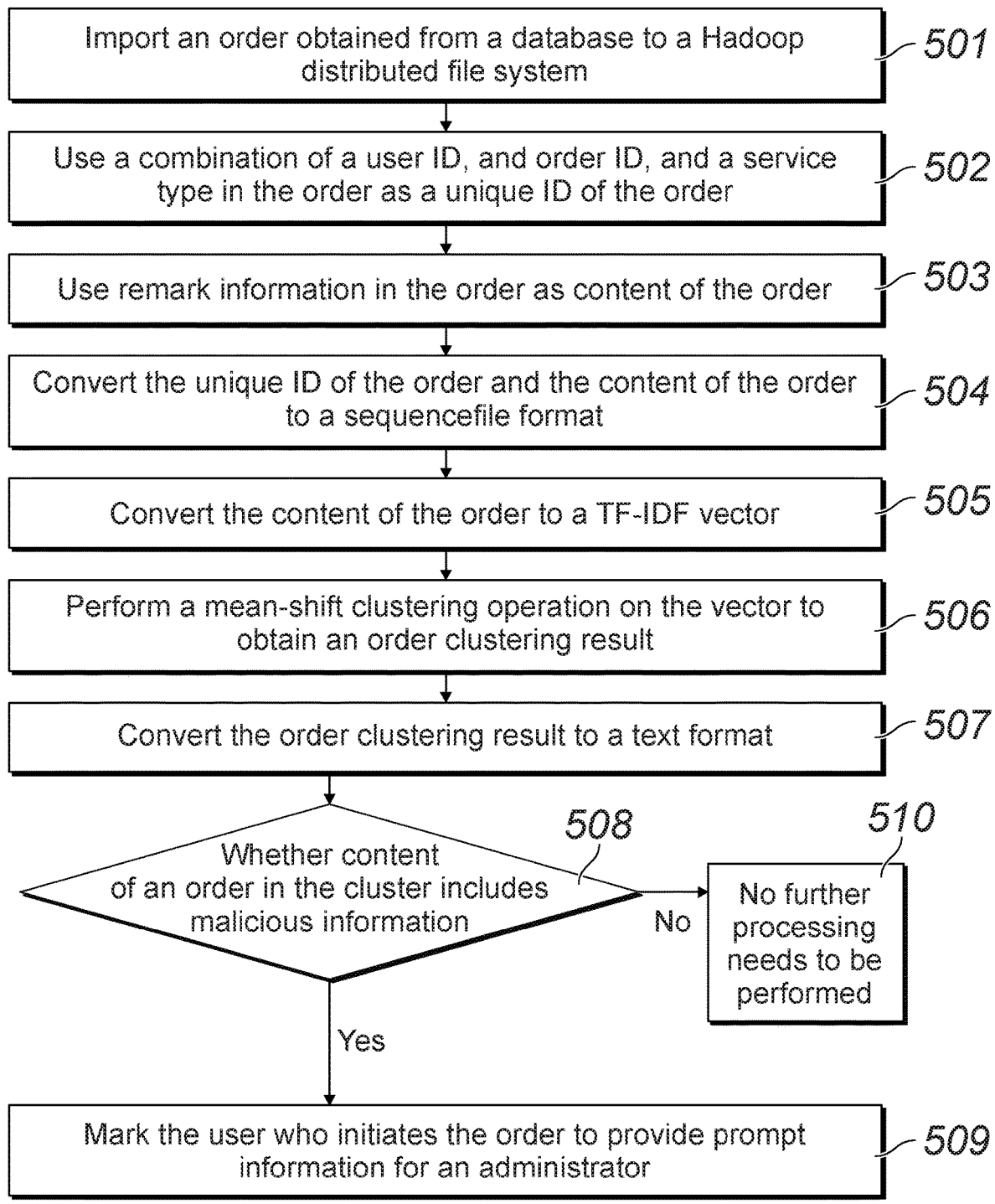
FIG. 5 is a flowchart illustrating a method for combating malicious information based on order clustering in an electronic transaction, according to an implementation of the present application.

FIG. 5 is a flowchart illustrating a method for combating malicious information based on order clustering in an electronic transaction, according to an implementation of the present application. In this implementation, the entire method is performed in a Hadoop distributed file system to improve overall work efficiency. In a clustering process, the mean-shift clustering method is used as an example for description. For example, for a collection service, an order initiated by the collection service includes a user ID, an order ID, a service type, a payor ID, a date, an amount, etc. The order further includes remark information. The remark information includes a uniform resource locator (URL) of a phishing website. A malicious user sends the information transferred to many users.

The following steps are included: Step 501: Import an order obtained from a database to a Hadoop distributed file system (HDFS).

Step 502: Use a combination of a user ID, an order ID, and a service type in the order as a unique ID of the order.

The combination in the present step may include combining the user ID, the order ID, and the service type to form the unique ID of the order or combining the last two characters of the user ID, the last two characters of the order ID, and the service type to form the unique ID of the order. The unique ID can also be generated in another way to uniquely identify the order. For example, the order can be uniquely identified by only the order ID.

Step 503: Use remark information in the order as content of the order.

In this implementation, the remark information of the order describes the content of the order. For example, the remark information includes a URL address of a phishing website. In another implementation, if the order further includes content such as a transaction record, this part of content can also be used as the content of the order. The transaction record can include a product description in the order. For a payment collection application, the transaction record can include a service title, a payor, an amount, etc.

In this case, the unique ID of each order corresponds to the content of the order.

Step 504: Convert the unique ID of the order and the content of the order to a sequence file format.

In the present step, the sequence file format obtained after the conversion is a data format used for the Hadoop distributed file system (HDFS). The processing method based on the HDFS can be used after the unique ID of the order and the content of the order are converted to this format, so as to improve processing efficiency.

Step 505: Convert the content of the order to a TF-IDF vector.

The TF-IDF vector obtained after the conversion has a mapping relationship <key, vector> with the unique ID of the order. The key is the unique ID of the order. The vector is formed by the content of the order, and is a mathematical expression form of the content of the order.

Step 506: Perform a mean-shift clustering operation on the vector to obtain an order clustering result.

In the present step, the content of the order is iteratively compared with a cluster. A cluster or a new cluster that includes the content of the order is output. Because there is a key-value (the unique ID of the order) that has a mapping relationship with the vector, a cluster that includes a particular order can be determined. An iteration parameter, a convergence parameter, etc. in the mean-shift clustering operation can be set by a developer based on actual implementations. An output result is in the sequence file format.

The order classification process based on the mean-shift clustering operation ends at this point.

Step 507: Convert the order clustering result to a text format.

The order clustering result is in the sequence file format in the earlier described step. It may not be convenient to subsequently determine and process the order clustering result. Therefore, the order clustering result needs to be converted to a text format.

Step 508: Determine whether content of an order in the cluster includes malicious information. If the content includes malicious information, proceed to step 509. If the content does not include malicious information, proceed to step 510.

Technologies such as a keyword-based method or a manual determining method can be used to determine whether the content of the order includes malicious information. One cluster can include many orders. In some cases, just one order in the cluster needs to be selected for the determination.

In another implementation, since a large amount of information can be transferred, and especially a larger amount of malicious information can be transferred, each cluster includes a plurality of orders after the clustering operation ends. Several clusters that include larger numbers of orders are selected (for example, select the top ten clusters) and sent to an administrator for monitoring, to achieve good monitoring result. Which clusters are more likely to be classified as malicious information can be determined based on the content of the selected top ten clusters.

Step 509: Mark the user who initiates the order to provide prompt information for an administrator.

In addition to the processing method described in the present step, there are other malicious information processing methods such as transaction freezing or account blocking. Those methods are not described here in detail for simplicity.

Step 510: If the content does not include malicious information, no further processing needs to be performed.

In the earlier described implementation, the mean-shift clustering operation can be used to classify an order in the electronic transaction system, and a new cluster can be automatically generated to reduce human involvement and adapt to classification of the changing malicious information in real time.

Figure 6:
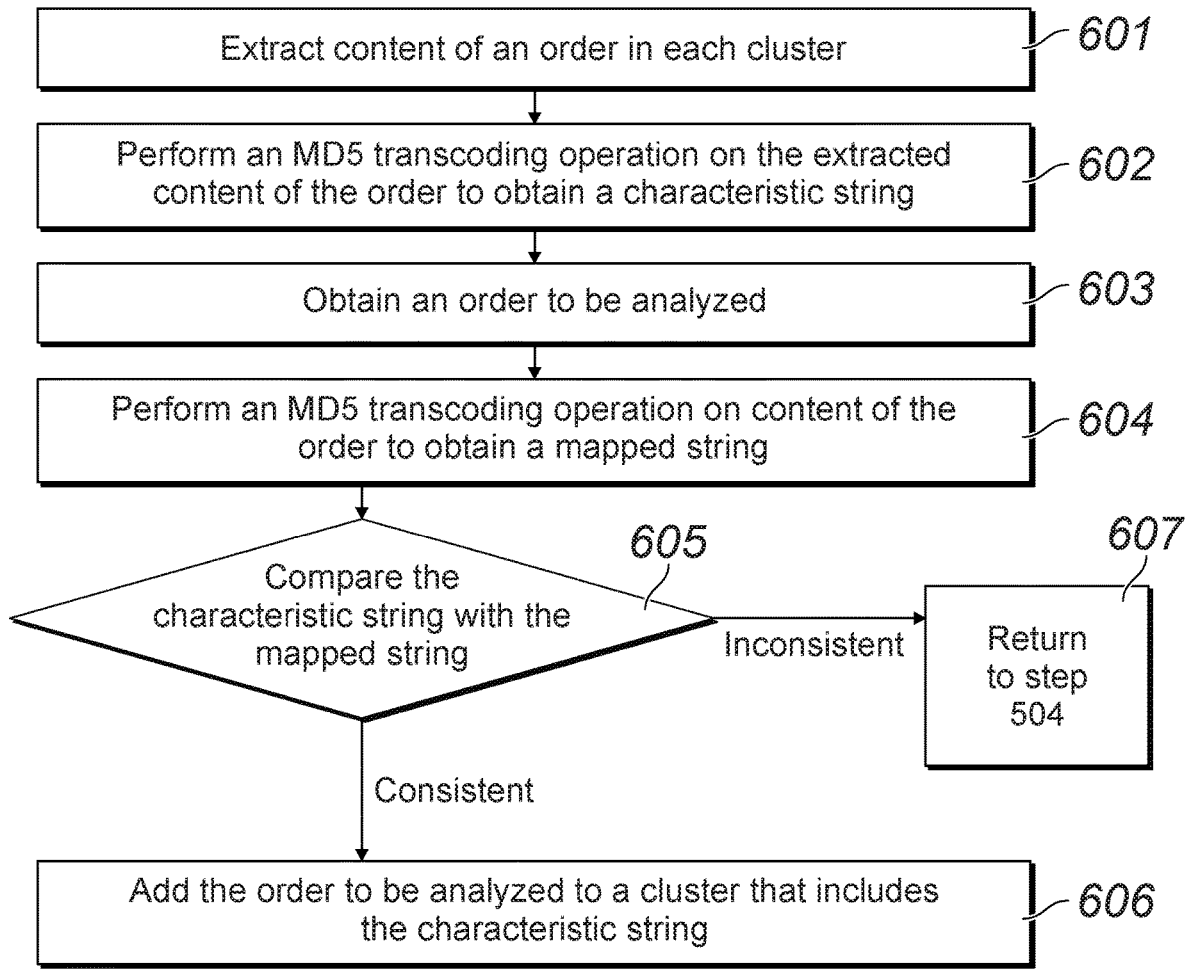
FIG. 6 is a flowchart illustrating a method for quickly classifying an order after clustering processing, according to an implementation of the present application.

FIG. 6 is a flowchart illustrating a method for quickly classifying an order after clustering processing, according to an implementation of the present application. This method is based on the implementation illustrated in FIG. 5. Each cluster includes many orders. A system receives and processes a new order to be analyzed.

FIG. 6 includes the following steps: Step 601: Extract content of an order in each cluster.

In step 601, the content of the order in each cluster can be randomly extracted. Because content of orders in each cluster is similar, any extracted content of an order can be used as a characteristic of the cluster.

Step 602: Perform an MD5 transcoding operation on the extracted content of the order to obtain a characteristic string.

In the present step, a characteristic string of each cluster can be obtained. In an optional implementation, the MD5 transcoding operation is one of many transcoding operations, other transcoding methods can also be used. Or, a developer can design a transcoding method as needed. The transcoding method used is not limited here.

Step 603: Obtain an order to be analyzed.

In the present step, the order to be analyzed can be obtained based on, for example, step 503 in the implementation illustrated in FIG. 5. Because the implementation illustrated in FIG. 5 is usually used to analyze an existing order, the implementation illustrated in FIG. 6 can be performed based on the implementation illustrated in FIG. 5. A new order can be analyzed after a plurality of clusters are established by using the earlier described method. It can achieve better real-time performance and avoid relatively complicated clustering operations.

Or, in the present step, information transferred (the order) can be compared and analyzed in real time to determine a cluster that includes the order.

Step 604: Perform an MD5 transcoding operation on content of the order to obtain a mapped string.

Step 605: Compare the characteristic string with the mapped string. If the two strings are consistent, proceed to step 606. If the two strings are inconsistent, proceed to step 607.

Step 606: Add the order to be analyzed to a cluster that includes the characteristic string.

Afterward, return to step 508 to continue cluster processing. If the content includes malicious information, the information transferred can be blocked from being forwarded.

In an optional step, when the mapped string of the order to be analyzed is the same as a characteristic string of certain cluster that has been marked as a junk class, directly proceed to step 509 without performing step 606. And automatic preventive measures such as transaction freezing or account blocking can be performed on the order.

Step 607: Return to step 504 to continue to perform clustering processing.

In the methods and the apparatuses in the implementations of the present application, the mean-shift clustering algorithm can be used to automatically classify the order in the electronic transaction, and a new cluster can be obtained through analysis based on real-time content of the order. When the order is processed, it can be transcoded. It can then be determined whether the transcoded order is the same as a characteristic string of an order in a certain cluster, in order to further improve order classification efficiency. The order can be imported to a distributed file system such as the HDFS to further improve order classification efficiency, by taking advantage of the characteristics of the distributed system.

For technical improvements, one can distinguish between a hardware improvement (for example, an improvement in circuit structures of a diode, a transistor, a switch, etc.) and a software improvement (an improvement in a method process). However, as technologies develop, improvements in many current method processes can be considered as a direct improvement in a hardware circuit structure. Almost all designers obtain corresponding hardware circuit structures by programming improved method processes to hardware circuits. Therefore, it cannot be said that the improvement in a method process cannot be implemented by using a hardware entity module. For example, a programmable logic device (PLD), such as a field programmable gate array (FPGA), is such an integrated circuit whose logic function is determined by programming a device by a user. A designer performs programming to "integrate" a digital system to a single PLD, without requiring a chip manufacturer to design and manufacture a dedicated integrated circuit chip 2. In addition, at present, instead of manually manufacturing an integrated chip, this type of programming is mostly implemented by using "logic compiler" software. The programming is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog2 are most commonly used. It should also be clear to a person skilled in the art that a hardware circuit of a logic method process can be easily obtained by performing logic programming on the method process through several earlier described hardware description languages and programming the method process to an integrated circuit.

A controller can be implemented in any appropriate way. For example, the controller can take the form of, for example, a microprocessor or a processor and a computer readable medium storing computer readable program code (such as software or firmware) that can be executed by the microprocessor or the processor, a logic gate, a switch, an application specific integrated circuit (ASIC), a programmable logic controller, and an embedded microcontroller. Examples of the controller include, but are not limited to, the following microcontrollers: ARC 625D, Atmel AT91SAM, Microchip PIC18F26K20, and Silicone Labs C8051F320. A memory controller can also be implemented as a part of control logic of a memory.

A person skilled in the art also know that, in addition to implementing the controller by using the computer readable program code, logic programming can be performed on method steps to allow the controller to implement the same function in forms of the logic gate, the switch, the programmable logic controller, the programmable logic controller, and the embedded microcontroller. Therefore, such a controller can be considered as a hardware component. An apparatus included in the controller and configured to implement various functions can be considered as a structure in the hardware component. Or, the apparatus configured to implement various functions can even be considered as both a software module implementing the method and a structure in the hardware component.

The system, apparatus, module or unit illustrated in the earlier described implementations can be implemented by a computer chip or an entity, or can be implemented by a product having a certain function.

For ease of description, the apparatus is described by dividing the functions into various units. Certainly, when the present application is implemented, the functions of all units can be implemented in one or more pieces of software and/or hardware.

It can be learned from description of the implementations that, a person skilled in the art can clearly understand that the present application can be implemented by using software in addition to a universal hardware platform. Based on such an understanding, the technical solutions in the present application essentially or the part contributing to the prior art can be implemented in a form of a software product. The software product may be stored in a storage medium, such as a ROM/RAM, a magnetic disk, or an optical disc, and includes several instructions for instructing a computer device (a personal computer, a server, or a network device) to perform the methods described in the implementations or in some parts of the implementations of the present application.

The implementations in the present specification are described in a progressive way. For same or similar parts in the implementations, reference may be made to each other. Each implementation focuses on a difference from other implementations. Particularly, a system implementation is similar to a method implementation, and therefore, is described briefly. For related parts, refer to partial descriptions in the method implementation.

The present application can be used in many general-purpose or dedicated computer system environments or configurations, for example, a personal computer, a server computer, a handheld device or a portable device, a flat panel device, a multi-processor system, a microprocessor-based system, a set-top box, a programmable consumer digital device, a network PC, a minicomputer, a mainframe computer, and a distributed computing environment including any one of the earlier described systems or devices.

The present application can be described in the general context of an executable computer instruction executed by a computer, for example, a program module. Generally, the program module includes a routine, a program, an object, a component, a data structure, etc. for executing a particular task or implementing a particular abstract data type. The present application can also be practiced in distributed computing environments. In the distributed computing environments, tasks are performed by remote processing devices that are connected through a communications network. In a distributed computing environment, the program module can be located in both local and remote computer storage media including storage devices.

The present application is described through implementations. However, a person of ordinary skill in the art knows that many modifications and variations of the present application may be made without departing from the spirit of the present application. It is intended that the claims include these modifications and variations without departing from the spirit of the present application.

Figure 7:
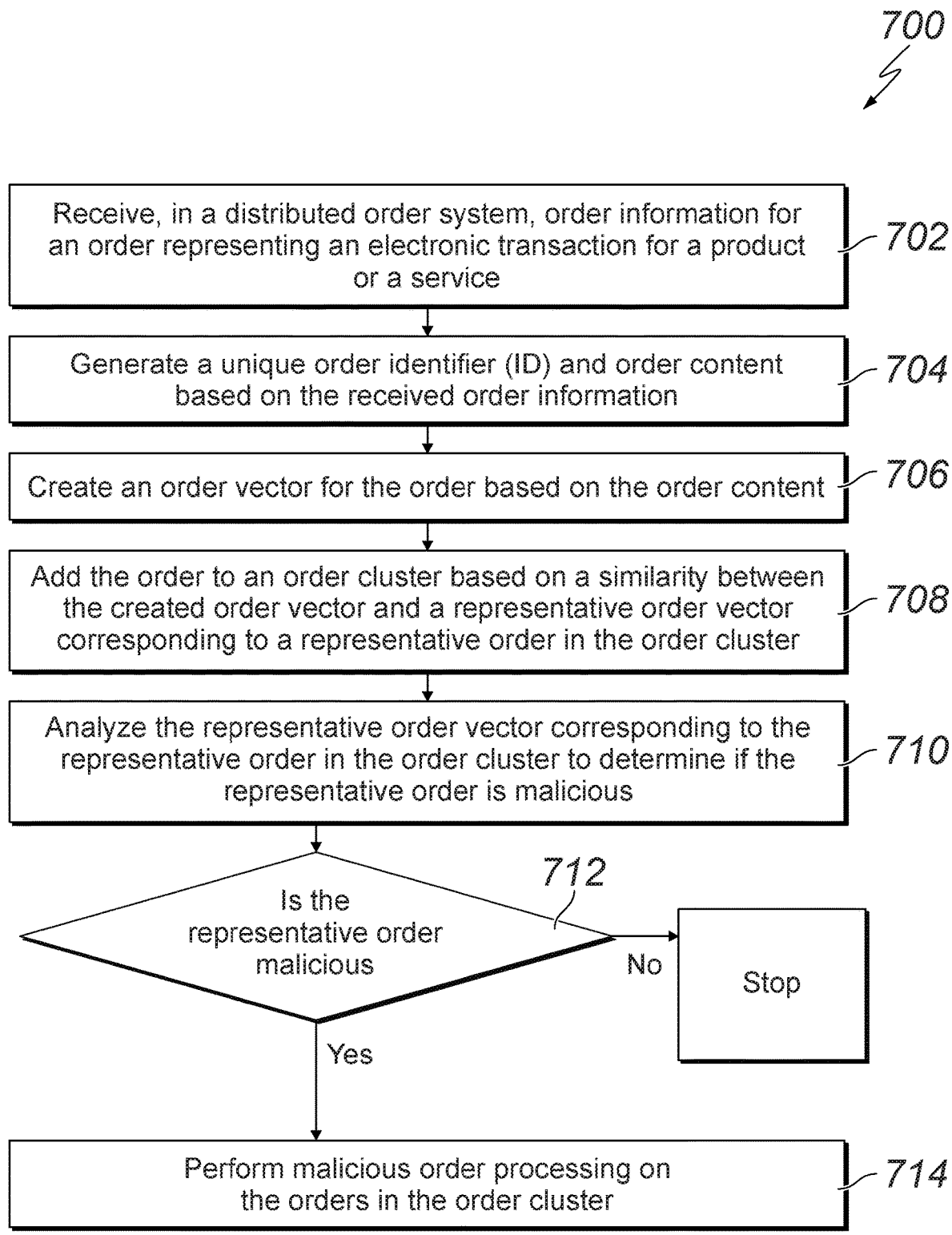
FIG. 7 is a flowchart illustrating an example of a computer-implemented method for clustering orders and determining malicious orders, according to an implementation of the present disclosure.

FIG. 7 is a flowchart illustrating an example of a computer-implemented method 700 for clustering orders and determining malicious orders, according to an implementation of the present disclosure. For clarity of presentation, the description that follows generally describes method 700 in the context of the other figures in this description. However, it will be understood that method 700 can be performed, for example, by any system, environment, software, and hardware, or a combination of systems, environments, software, and hardware, as appropriate. In some implementations, various steps of method 700 can be run in parallel, in combination, in loops, or in any order.

At 702, order information for an order representing an electronic transaction in the distributed order system for a product or a service is received by one or more processors over a network. For example, a server of an electronic transaction system can receive an order that is placed at a remote location, such as a user's home or through a mobile application executing on the user's mobile device. The order can be an order for a product, such as a camera, or for a service, such as a dry cleaning order. From 702, method 700 proceeds to 704.

At 704, a unique order ID and order content based on the received order information are generated by the one or more processors. As an example, applications that are part of (and run on processors of) the electronic transaction system can process the received order. Processing can include generation, by the generation unit 201, of a unique order ID and content that is based on content of the received order, including information that is unique to the user placing the order, a date/time that the order was placed, the product or service that corresponds to the order, and a price associated with the order.

In some implementations, generating the unique order ID is based on a user ID, an order ID, and a product or service type in the order information for the order, and generating the order content is based on one or both of an order title or order remark information in the order information for the order. For example, the unique order ID can be based on a unique ID of the user (for example, the user ID, a subscription number, or a user alias), an alpha-numeric order ID, a product/service type (for example, photography equipment or laundry). The order content can include an order title (for example, identifying a product ID or name) and remark information entered by the user, such as a shipping address, a style, a size, and a color. From 704, method 700 proceeds to 706.

At 706, an order vector for the order is created based on the order content. As an example, the vector conversion unit 202 can generate an order vector as a string of characters that includes information from the order. The order vector can exclude parts of the order information that may not be useful when comparing order vectors, such as terms or phrases that are common parts of speech (for example, "and" and "the"). In some implementations, portions of the order content that are used to create the order vector can depend on the type of product or service, such as to use terms or phrases that are pertinent to the type.

In some implementations, creating the order vector for the order using the order ID and the order content includes converting the order content to a term frequency-inverse document frequency (TF-IDF) vector representing the order content, where the TF-IDF vector is operable to be analyzed for containing malicious indicators. For example, a weight can be applied to each term in the order, and the weighting can be used to normalize the count/frequency of the term. This can facilitate the identification of malicious terms, such as URLs of malware-related sites. From 706, method 700 proceeds to 708.

At 708, the order vector is added, by the one or more processors, to an order cluster based on a similarity between the created order vector and a representative order vector corresponding to a representative order in the order cluster. As an example, if an order vector is similar to at least one of multiple order vectors corresponding to orders in a particular order cluster, then the clustering operation unit 203 can add the order associated with the order vector to the order cluster. In some cases, it can be possible that the order can be added to multiple order clusters.

In some implementations, adding the created order vector to the order cluster can include mapping the content of the order to a characteristic string that is shared by the existing order vectors in the order cluster. For example, existing order vectors for orders in an order cluster can share the same characteristic string, such as including terms or phrases from the order content that lead to the grouping of the orders into the same order cluster. Then, when an order vector for a new order is to be potentially matched to an order vector in an order cluster, the content in the order cluster can be mapped to the same characteristic string.

In some implementations, method 700 can further include determining that the characteristic string of the created order vector does not match the characteristic string of the existing order vectors in the order cluster and creating a new order cluster that includes the created order vector. For example, if a given order vector does not match any order vectors of existing order clusters, then the given order can be assigned to a new order cluster that is newly created. From 708, method 700 proceeds to 710.

At 710, the representative order vector corresponding to the representative order in the order cluster is analyzed by the one or more processors to determine if the representative order is malicious. For example, the processing unit 404 can parse or scan characters in the representative order to locate any character strings that identify or are related to malicious entities. From 710, method 700 proceeds to 712.

At 712, a determination is made as to whether the representative order is malicious. As an example, if the processing unit 404 determines that the representative order is malicious, then method 700 proceeds to 714. Otherwise, method 700 stops.

In some implementations, determining that the representative order is malicious can include determining that order remark information embedded in the representative order vector includes a uniform resource locator (URL) address of a phishing website. For example, the processing unit 404 can include logic that looks for specific text (that is part of the remarks) that is known to indicate that the representative order is malicious. The logic can cause a comparison of information in the representative order vector to stored databases of known textual malicious indicators.

In some implementations, determining that the representative order is malicious can include determining that order remark information for the order embedded in the representative order vector includes promotional information that is malicious, where the promotional information includes one or both of promotional text and a promotional image. For example, the processing unit 404 can include logic that looks for specific URLs or images that are known to indicate that the representative order is malicious. The logic can include comparing information in the representative order vector to stored databases of known malicious URLs and known malicious images. Other databases can also exist that are used to identify malicious content. In some implementations, third-party sources can be used or accessed for identifying malicious content.

At 714, malicious order processing is performing, by the one or more processors, on the orders in the order cluster. For example, the distributed order system can take action on the orders in the order cluster. The action that is taken can include mass cancelation of the orders and updating of databases that track malicious orders. In some implementations, information regarding malicious orders can be provided to other systems, including the sale of information to other entities. The information can include, for example, known URLs, user IDs, or other order information that has been determined to be associated with malicious orders. In some implementations, the information that is stored can be used to identify, cancel, and block incoming orders that are known to be malicious. From 714, method 700 stops.

The techniques described in this disclosure can be used to improve the automatic identification, classification, and resolution of electronic transactions that are determined to be malicious. The techniques can include order clustering in which orders are automatically grouped by characteristic strings of order vectors that are generated from order information. After an order is preliminarily processed, clustering operations can be performed to more accurately classify the order and reduce human involvement. In addition, orders in a malicious information cluster can be quickly processed. Similarities in orders can be used to identify patterns of orders that are known (or determined to be) malicious. As such, human involvement can be reduced, and clusters of malicious orders can be automatically generated and processed.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method comprising:
  receiving, by one or more processors and over a network, order information for an order, wherein an order is an electronic transaction that is associated with a product or a service;
  generating, by the one or more processors and based on the received order information, (i) a unique order identifier (ID), and (ii) order content, wherein the unique order identifier is generated based at least on a user identifier and a product or service type;
  converting, by the one or more processors, the unique order ID and the order content to a SequenceFile format;
  generating, by the one or more processors and based on the converted order content, an order vector for the order;
  performing, by the one or more processors, a clustering operating on the order vector to obtain an order clustering result, the order clustering result being in the SequenceFile format;
  converting, by the one or more processors, the order clustering result to a text format;
  determining, by the one or more processors based on the converted order clustering result,
  that that a representative order in an order cluster identified in the order clustering result has been classified as malicious; and
  in response to determining that the representative order in the order cluster identified in the order clustering result has been classified as malicious, halting, by one or more processor, processing of the order.

2. The method of claim 1, wherein determining that the representative order has been classified as malicious comprises determining that remark information included in a representative order vector corresponding to the representative order includes a uniform resource locator (URL) of a website that has been identified as a phishing website.

3. The method of claim 1, wherein determining that the representative order has been classified as malicious comprises determining that remark information included in a representative order vector corresponding to the representative order includes promotional information that has been identified as malicious.

4. The method of claim 3, wherein the promotional information comprises promotional text or a promotional image.

5. The method of claim 1, wherein generating the order vector comprises converting the order content to a term frequency-inverse document frequency (TF-IDF) vector.

6. The method of claim 1, wherein the order content is generated based on an order title or remark information.

7. A non-transitory, computer-readable medium storing one or more instructions executable by one or more processors to perform operations comprising:
  receiving, by the one or more processors and over a network, order information for an order, wherein an order is an electronic transaction that is associated with a product or a service;
  generating, by the one or more processors and based on the received order information, (i) a unique order identifier (ID), and (ii) order content, wherein the unique order identifier is generated based at least on a user identifier and a product or service type;
  converting, by the one or more processors, the unique order ID and the order content to a SequenceFile format;
  generating, by the one or more processors and based on the converted order content, an order vector for the order;
  performing, by the one or more processors, a clustering operating on the order vector to obtain an order clustering result, the order clustering result being in the SequenceFile format;
  converting, by the one or more processors, the order clustering result to a text format;
  determining, by the one or more processors based on the converted order clustering result,
  that a representative order in an order cluster identified in the order clustering result has been classified as malicious; and
  in response to determining that the representative order in the order cluster identified in the order clustering result has been classified as malicious, halting, by the one or more processor, processing of the order.

8. The medium of claim 7, wherein determining that the representative order has been classified as malicious comprises determining that remark information included in a representative order vector corresponding to the representative order includes a uniform resource locator (URL) of a website that has been identified as a phishing website.

9. The medium of claim 7, wherein determining that the representative order has been classified as malicious comprises determining that remark information included in a representative order vector corresponding to the representative order includes promotional information that has been identified as malicious.

10. The medium of claim 9, wherein the promotional information comprises promotional text or a promotional image.

11. The medium of claim 7, wherein generating the order vector comprises converting the order content to a term frequency-inverse document frequency (TF-IDF) vector.

12. The medium of claim 7, wherein the order content is generated based on an order title or remark information.

13. A computer-implemented system comprising:
  one or more processors; and
  one or more computer memory devices interoperably coupled with the one or more processors and having tangible, non-transitory, machine-readable media storing one or more instructions that, when executed by the one or more processors, perform one or more operations comprising:
  receiving, by the one or more processors and over a network, order information for an order, wherein an order is an electronic transaction that is associated with a product or a service;
  generating, by the one or more processors and based on the received order information, (i) a unique order identifier (ID), and (ii) order content, wherein the unique order identifier is generated based at least on a user identifier and a product or service type;

converting, by the one or more processors, the unique order ID and the order content to a SequenceFile format;

generating, by the one or more processors and based on the converted order content, an order vector for the order;

performing, by the one or more processors, a clustering operating on the order vector to obtain an order clustering result, the order clustering result being in the SequenceFile format;

converting, by the one or more processors, the order clustering result to a text format;

determining, by the one or more processors based on the converted order clustering result, that a representative order in an order cluster identified in the order clustering result has been classified as malicious; and in response to determining that the representative order in the order cluster identified in the order clustering result has been classified as malicious, halting, by the one or more processor, processing of the order.

14. The system of claim 13, wherein determining that the representative order has been classified as malicious comprises determining that remark information included in a representative order vector corresponding to the representative order includes a uniform resource locator (URL) of a website that has been identified as a phishing website.

15. The system of claim 13, wherein determining that the representative order has been classified as malicious comprises determining that remark information included in a representative order vector corresponding to the representative order includes promotional information that has been identified as malicious.

16. The system of claim 15, wherein the promotional information comprises promotional text or a promotional image.

17. The system of claim 13, wherein generating the order vector comprises converting the order content to a term frequency-inverse document frequency (TF-IDF) vector.

18. The system of claim 13, wherein the order content is generated based on an order title or remark information.

* * * * *